(No Model.)

W. CROSS.
TIRE UPSETTER.

No. 313,062. Patented Mar. 3, 1885.

WITNESSES:
Thos. Houghton.
Chas. L. Benjamin.

INVENTOR
Washington Cross.
BY
McFarland & Benjamin
ATTORNEYS

UNITED STATES PATENT OFFICE.

WASHINGTON CROSS, OF PULASKI, TENNESSEE.

TIRE-UPSETTER.

SPECIFICATION forming part of Letters Patent No. 313,062, dated March 3, 1885.

Application filed October 9, 1884. (No model.)

*To all whom it may concern:*

Be it known that I, WASHINGTON CROSS, a citizen of the United States, residing at Pulaski, in the county of Giles and State of Tennessee, have invented certain new and useful Improvements in Implements for Shrinking Wagon-Tires; and I do declare the following to be a full, clear, and exact description of the invention, such as will enable others skilled in the art to which it appertains to make and use the same, reference being had to the accompanying drawings, and to the letters and figures of reference marked thereon, which form a part of this specification.

This invention relates to devices for shrinking old wagon-tires; and its object is to save the necessity of cutting and rewelding the tire.

Figure 1:
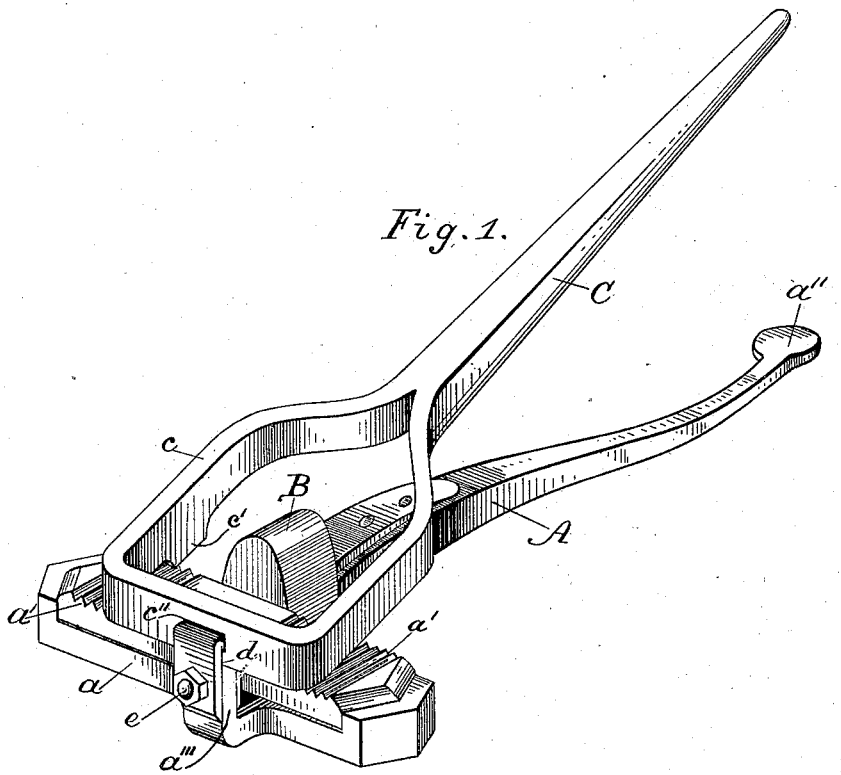
Figure 2:
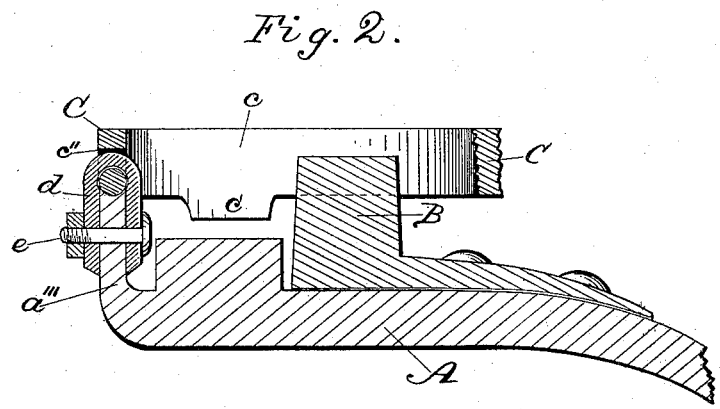

In the accompanying drawings, wherein like letters represent like parts, Figure 1 is a front perspective of the device, and Fig. 2 is a detailed view, partly in section, designed to show the mode of hinging the tool.

A is a stationary lever, provided with a cross-head, $a$, corrugated on its face, as shown at $a'$. The lever is so curved that the under surface of the cross-head may rest upon an anvil of ordinary height, in which event the lever is steadied upon the ground by its flat toe $a''$.

B is a core of solid metal, attached rigidly to the face of the lever A, as shown.

C is a movable hand-lever, spreading into a yoke, $c$, and provided on its under surface with teeth $c'$. This lever is hinged to the stationary lever in any suitable manner which will permit the teeth $c'$ to bite squarely upon the face of a wagon-tire placed upon the cross-head $a$.

One method of making the hinge-connection is shown herewith, wherein an offset, $a'''$, is formed at the head of the stationary lever, to support the lever C, which is hinged to said offset by the co-operation of the slot $c''$, the staple $d$, and the nut-bolt $e$.

The mode of operation is as follows: The tire, being removed from the wheel, is heated along any desired part of its circumference and the heated part laid on the surface of the core B. The lever C is then pressed down and forms a crimp or loop in the heated part of the tire. The tire is then placed on the cross-head $a$ in such a manner that the teeth $c'$ and the corrugations $a'$ will seize and hold the tire on either side of the crimp, which is then beaten down with hammers. When the tire has been sufficiently shrunk, it may be replaced on the wheel in the ordinary way.

Having thus sufficiently described my invention, what I claim to be new and useful, and desire to secure by Letters Patent, is the following:

A tool for shrinking wagon-tires, consisting in the combination of the levers A and C with the core B, said lever C being suitably hinged to the lever A, and said tool being in all respects constructed, arranged, and operated substantially in the manner and for the purposes herein shown and described.

In testimony whereof I affix my signature in presence of two witnesses.

WASHINGTON CROSS.

Witnesses:
  J. J. PHILLIPS,
  J. L. JONES.